(12) United States Patent
Yee

(10) Patent No.: US 10,203,259 B2
(45) Date of Patent: Feb. 12, 2019

(54) APPARATUS FOR DETECTING VEHICLE PITCH ANGLE USING ACCELERATION SENSOR AND GYRO SENSOR AND METHOD THEROF

(71) Applicant: HYUNDAI AUTRON CO., LTD., Seongnam-si (KR)

(72) Inventor: Jong-Yoon Yee, Gunpo-si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 109 days.

(21) Appl. No.: 15/373,726

(22) Filed: Dec. 9, 2016

(65) Prior Publication Data

US 2017/0167942 A1 Jun. 15, 2017

(30) Foreign Application Priority Data

Dec. 14, 2015 (KR) ........................ 10-2015-0178593

(51) Int. Cl.
*G01M 1/12* (2006.01)
*G01C 19/34* (2006.01)
*G01P 15/18* (2013.01)
*G01C 21/16* (2006.01)

(52) U.S. Cl.
CPC ............. *G01M 1/122* (2013.01); *G01C 19/34* (2013.01); *G01C 21/16* (2013.01); *G01P 15/18* (2013.01)

(58) Field of Classification Search
CPC ....... G01M 1/122; G01C 21/16; G01C 19/34; G01P 15/18
See application file for complete search history.

(56) References Cited

U.S. PATENT DOCUMENTS

2009/0138232 A1 * 5/2009 Fuwa ..................... G01B 21/22
702/154

FOREIGN PATENT DOCUMENTS

| JP | 2012-096664 A | 5/2012 | |
| JP | 2012-106719 A | 6/2012 | |
| WO | WO-2008142757 A1 * | 11/2008 | ....... B60G 17/01908 |

* cited by examiner

*Primary Examiner* — Rodney A Butler
(74) *Attorney, Agent, or Firm* — Baker McKenzie; Harry Park

(57) ABSTRACT

The present disclosure includes a vehicle state recognition unit configured to determine states of a vehicle using an acceleration value and an angular velocity value, a stopping state gravity vector calculation unit configured to calculate a stopping state gravity vector value, an accelerating state vehicle acceleration vector calculation unit configured to calculate a vehicle acceleration vector value, a vehicle pitch angle vector calculation unit configured to calculate a vehicle pitch angle vector value, and a vehicle pitch angle calculation unit configured to calculate a vehicle pitch angle using a corresponding vehicle pitch angle vector value.

18 Claims, 6 Drawing Sheets

APPARATUS FOR DETECTING VEHICLE PITCH ANGLE USING ACCELERATION SENSOR AND GYRO SENSOR AND METHOD THEROF

CROSS-REFERENCE TO RELATED APPLICATIONS

This application claims the benefit of Korean Patent Application No. 10-2015-0178593, filed on Dec. 14, 2015, entitled "APPARATUS FOR PITCH ANGLE DETECTING OF VEHICLE USING GYRO SENSOR AND ACCELERATION SENSOR AND METHOD THEREOF", which is hereby incorporated by reference in its entirety into this application.

BACKGROUND

1. Technical Field

The present disclosure relates to an apparatus for detecting a vehicle pitch angle using an acceleration sensor and a gyro sensor and a method thereof.

2. Description of the Related Art

Generally, a vehicle is provided with a lighting system for use in observing an object in a driving direction and informing other vehicle or a pedestrian of a driving state of the vehicle when driving at night.

Such a lighting system of the vehicle may be roughly classified into a lighting lamp, a signal lamp, and an indicating lamp. The lighting lamp may be classified into a headlamp, a backup lamp, a fog lamp, and a room lamp. The signal lamps may be classified into a brake lamp, a turn signal lamp, and an emergency lamp. The indicating lamp may be classified into a side lamp, a height lamp, a tail lamp, a license plate lamp, and a parking lamp.

Here, the headlamp, which is also referred to as a headlight, is the lighting lamp that illuminates a roadway in front of the vehicle that is driving, and it requires brightness, at night, capable of identifying an obstacle on the roadway at 100 meters in front of the vehicle.

The standard specification of such a headlamp is differently set for each country, and specifically, an irradiation direction of a headlamp beam is differently set depending on the left driving or the right driving.

The headlamp for a vehicle is generally used for performing a lighting function for observing an object, an instruction for informing other vehicle or a pedestrian of a driving state of the vehicle, signal and warning functions, and the like.

Since a direction of irradiation is adjustable according to a driving condition including a roadway environment, the vehicle condition, and the like, a conventional vehicle headlamp has been introduced by an attempt to provide a driver with advantageous visibility.

A vertical moving system of the headlamp senses an inclination of the vehicle and controls a vertical angle of the headlamp through a height detection sensor, that is, a vehicle height sensor which is mounted on the vertical moving system.

For a vertical movement, the headlamp may be configured with the vehicle height sensor disposed in forward and backward directions of the headlamp, an electronic control unit (ECU), and a vertical moving actuator. In such a case, there is a problem in that the headlamp is configured with a plurality of high-priced sensors so that costs and a weight of the headlamp are increased.

Further, when a part is replaced due to a failure of the ECU or the vehicle height sensor, there is a limitation in that a correction process for each of the headlamp and the vehicle height sensor is additionally required. That is, the vehicle height sensor, which is a device for detecting a pitch angle of an existing vehicle, there is a limitation in accuracy in detecting the pitch angle of the vehicle.

SUMMARY

To address the above described problem, an object of the present disclosure is to provide an apparatus for detecting a vehicle pitch angle using an acceleration sensor and a gyro sensor, which is capable of effectively reducing costs compared to those of a conventional apparatus for detecting a vehicle pitch angle by calculating a vehicle pitch angle using an acceleration sensor and a gyro sensor through a structure effective and cost-effective system.

To attain the above described object, in accordance with a first aspect of the present disclosure is to provide an apparatus for detecting a vehicle pitch angle using an acceleration sensor and a gyro sensor, which includes an acceleration sensor unit configured to measure an acceleration value of a vehicle, a gyro sensor unit configured to measure an angular velocity value, a vehicle state recognition unit configured to determine a stopping state, an accelerating state, and a driving state of the vehicle using the acceleration value and the angular velocity value which are respectively measured from the acceleration sensor unit and the gyro sensor unit, a stopping state gravity vector calculation unit configured to calculate a stopping state gravity vector value using an acceleration sensor value measured in the stopping state that is determined from the vehicle state recognition unit, an accelerating state vehicle acceleration vector calculation unit configured to calculate a vehicle acceleration vector value by subtracting the stopping state gravity vector value, which is calculated from the stopping state gravity vector calculation unit, from the acceleration sensor value measured in the accelerating state that is determined from the vehicle state recognition unit, a vehicle pitch angle vector calculation unit configured to calculate a vehicle pitch angle vector value by continuously summing the vehicle acceleration vector value calculated from the accelerating state vehicle acceleration vector calculation unit while the vehicle moves a predetermined distance, and a vehicle pitch angle calculation unit configured to calculate a vehicle pitch angle using a corresponding vehicle pitch angle vector value when a magnitude of the corresponding vehicle pitch angle vector value calculated from the vehicle pitch angle vector calculation unit is equal to or greater than a preset threshold value.

Here, the acceleration sensor unit may be preferably configured with three acceleration sensors, which are horizontally attached to the vehicle and orthogonally intersected with each other to form an X-axis, a Y-axis, and a Z-axis, respectively, and transmit acceleration sensor values Ay and Az in a driving direction (that is, the Y-axis) of the vehicle and a ground direction (that is, the Z-axis) thereof to the vehicle state recognition unit.

Preferably, the gyro sensor unit may be configured with three gyro sensors, which are horizontally attached to the vehicle and orthogonally intersected with each other to form Rx, Ry, and Rz, respectively, and transmit the angular velocity value in a pitch direction to the vehicle state recognition unit.

Preferably, the vehicle state recognition unit may calculate an inclined angle value with respect to a horizontal plane based on a value of an atan (Ay/Az) by receiving the acceleration sensor values Ay and Az in the driving direction (that is, the Y-axis) of the vehicle and the ground direction (that is, the Z-axis) thereof from the acceleration sensor unit, and determine the vehicle as being in the stopping state when the calculated angle value is maintained without a variance for a specific predetermined time.

Preferably, when a variance occurs at the value of the atan (Ay/Az) in the stopping state, the vehicle state recognition unit may determine the vehicle as being in the accelerating state.

Preferably, when the angular velocity value measured from the gyro sensor unit in the accelerating state is equal to or greater than a preset value, or a moving distance, which is estimated from the acceleration sensor values measured from the acceleration sensor unit, of the vehicle is equal to or greater than a preset distance, the vehicle state recognition unit may determine the vehicle as being in the driving state.

Preferably, the vehicle state recognition unit may calculate an inclined angle value with respect to a horizontal plane based on a value of an Atna (Ay/Az) by receiving the acceleration sensor values Ay and Az in the driving direction (that is, the Y-axis) of the vehicle and the ground direction (that is, the Z axis) thereof from the acceleration sensor unit, and determine the vehicle as being in the stopping state when the calculated angle value is maintained without a variance for a specific predetermined time, and the stopping state gravity vector calculation unit may calculate stopping state gravity vector values Gy and Gz using the acceleration sensor values Ay and Az that are measured in the stopping state, which is determined from the vehicle state recognition unit, of the vehicle.

Preferably, the vehicle state recognition unit may calculate an inclined angle value with respect to a horizontal plane based on a value of an Atna (Ay/Az) by receiving the acceleration sensor values Ay and Az in the driving direction (that is, the Y-axis) of the vehicle and the ground direction (that is, the Z axis) thereof from the acceleration sensor unit, and determine the vehicle as being in the stopping state when the calculated angle value is maintained without a variance for a specific predetermined time and as being in the accelerating state when a variance occurs at the value of the Atna (Ay/Az) in the stopping state, the stopping state gravity vector calculation unit may calculate stopping state gravity vector values Gy and Gz using the acceleration sensor values Ay and Az measured in the stopping state, which is determined from the vehicle state recognition unit, of the vehicle, and the accelerating state vehicle acceleration vector calculation unit may calculate vehicle acceleration vector values (Ay−Gy=Vy) and (Az−Gz=Vz) by subtracting the stopping state gravity vector values Gy and Gz, which are calculated from the stopping state gravity vector calculation unit, from the acceleration sensor values Ay and Az measured in the accelerating state, which is determined from the vehicle state recognition unit, of the vehicle.

Preferably, the vehicle pitch angle vector calculation unit may calculate vehicle pitch angle vector values Py and Pz by continuously summing the vehicle acceleration vectors Vy and Vz calculated from the accelerating state vehicle acceleration vector calculation unit, and the vehicle pitch angle calculation unit may calculate a vehicle pitch angle based on the value of the Atna (Pz/Py) when a magnitude of each of the vehicle pitch angle vectors Py and Pz calculated from the vehicle pitch angle vector calculation unit is equal to or greater than a preset threshold value In accordance with a second aspect of the present disclosure is to provide a method for detecting a vehicle pitch angle using an acceleration sensor unit and a gyro sensor unit, which includes (a) measuring an acceleration value and an angular velocity value through the acceleration sensor unit and the gyro sensor unit, respectively, (b) determining a stopping state, an accelerating state, and a driving state of a vehicle through a vehicle state recognition unit using the acceleration value and the angular velocity value which are measured in Operation (a), (c) calculating a stopping state gravity vector value through a stopping state gravity vector calculation unit using an acceleration sensor value measured in the stopping state, which is determined in Operation (b), of the vehicle, (d) calculating a vehicle acceleration vector value through an accelerating state vehicle acceleration vector calculation unit by subtracting the stopping state gravity vector value calculated in Operation (c) from an acceleration sensor value measured in the accelerating state, which is measured in Operation (b), of the vehicle, (e) calculating a vehicle pitch angle vector value through a vehicle pitch angle vector calculation unit by continuously summing the vehicle acceleration vector value calculated in Operation (d) while the vehicle moves a predetermined distance, and (f) calculating a vehicle pitch angle using a corresponding vehicle pitch angle vector value through a vehicle pitch angle calculation unit when a magnitude of the corresponding vehicle pitch angle vector value calculated in Operation (e) is equal to or greater than a preset threshold value.

Here, in Operation (a), the acceleration sensor unit may be preferably configured with three acceleration sensors, which are horizontally attached to the vehicle and orthogonally intersected with each other to form an X-axis, a Y-axis, and a Z-axis, respectively, and transmit acceleration sensor values Ay and Az in a driving direction (that is, the Y-axis) of the vehicle and a ground direction (that is, the Z-axis) thereof to the vehicle state recognition unit.

Preferably, in Operation (a), the gyro sensor unit may be configured with three gyro sensors, which are horizontally attached to the vehicle and orthogonally intersected with each other to form Rx, Ry, and Rz, respectively, and transmit the angular velocity value in a pitch direction to the vehicle state recognition unit.

Preferably, in Operation (b), the vehicle state recognition unit may calculate an inclined angle value with respect to a horizontal plane based on a value of an Atna (Ay/Az) by receiving the acceleration sensor values Ay and Az in the driving direction (that is, the Y-axis) of the vehicle and the ground direction (that is, the Z-axis) thereof from Operation (a), and determines the vehicle as being in the stopping state when the calculated angle value is maintained without a variance for a specific predetermined time.

Preferably, when a variance occurs at the value of the Atna (Ay/Az) in the stopping state, the vehicle state recognition unit may determine the vehicle as being in the accelerating state.

Preferably, when the angular velocity value measured in Operation (a) in the accelerating state is equal to or greater than a preset value, or a moving distance, which is estimated from the acceleration sensor values Ay and Az measured in Operation (a), of the vehicle is equal to or greater than a preset distance, the vehicle state recognition unit may determine the vehicle as being in the driving state.

Preferably, in Operation (b), the vehicle state recognition unit may calculate an inclined angle value with respect to a horizontal plane based on a value of an Atna (Ay/Az) by receiving the acceleration sensor values Ay and Az in the driving direction (that is, the Y-axis) of the vehicle and the ground direction (that is, the Z axis) thereof from Operation (a), and determine the vehicle as being in the stopping state when the calculated angle value is maintained without a variance for a specific predetermined time, and in Operation (c), the stopping state gravity vector calculation unit may calculate stopping state gravity vector values Gy and Gz using the acceleration sensor values Ay and Az that are measured in the stopping state, which is determined from the vehicle state recognition unit, of the vehicle.

Preferably, in Operation (b), the vehicle state recognition unit may calculate an inclined angle value with respect to a horizontal plane based on a value of an Atna (Ay/Az) by receiving the acceleration sensor values Ay and Az in the driving direction (that is, the Y-axis) of the vehicle and the ground direction (that is, the Z axis) thereof from Operation (a), and determine the vehicle as being in the stopping state when the calculated angle value is maintained without a variance for a specific predetermined time and as being in the accelerating state when a variance occurs at the value of the Atna (Ay/Az) in the stopping state, in Operation (c), the stopping state gravity vector calculation unit may calculate stopping state gravity vector values Gy and Gz using the acceleration sensor values Ay and Az measured in the stopping state, which is determined in Operation (b), of the vehicle, and in Operation (d), the accelerating state vehicle acceleration vector calculation unit may calculate vehicle acceleration vector values (Ay−Gy=Vy) and (Az−Gz=Vz) by subtracting the stopping state gravity vector values Gy and Gz, which are calculated in Operation (c), from the acceleration sensor values Ay and Az measured in the accelerating state, which is determined in Operation (b), of the vehicle.

Preferably, in Operation (e), the vehicle pitch angle vector calculation unit may calculate vehicle pitch angle vector values Py and Pz by continuously summing the vehicle acceleration vector values Vy and Vz calculated in Operation (d), and in Operation (f), the vehicle pitch angle calculation unit may calculate a vehicle pitch angle based on the value of the Atna (Pz/Py) when a magnitude of each of the vehicle pitch angle vectors Py and Pz calculated in Operation (e) is equal to or greater than a preset threshold value.

In accordance with a third aspect of the present disclosure, it is provided a computer-readable storage medium storing a program capable of performing the above described method for detecting a vehicle pitch angle using an acceleration sensor and a gyro sensor.

The method for detecting a vehicle pitch angle using an acceleration sensor and a gyro sensor according to the present disclosure may be implemented with computer-readable codes on a computer-readable storage medium. The computer-readable storage medium includes all sort of storage devices in which computer-readable data is stored.

For example, the computer-readable storage medium includes a read-only-memory (ROM), a random-access memory (RAM), a compact disc (CD) ROM, a magnetic tape, a hard disk, a floppy disk, a removable storage device, a non-volatile memory (for example, a flash memory), an optical data storage device, and the like.

DETAILED DESCRIPTION

Figure 1:
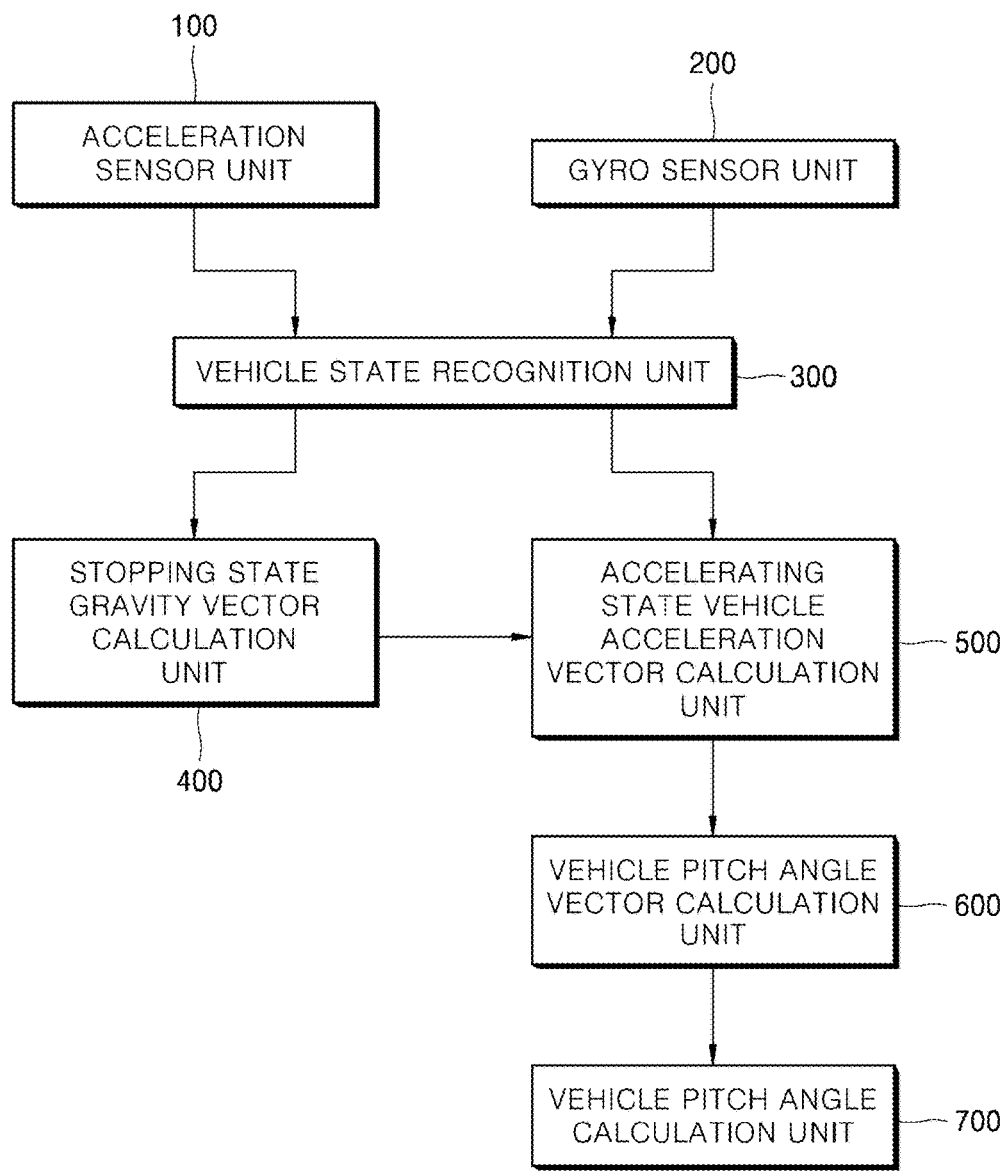
FIG. 1 is an entire block configuration diagram for describing an apparatus for detecting a vehicle pitch angle using an acceleration sensor and a gyro sensor according to one embodiment of the present disclosure.

Advantages and features of the present disclosure described herein and methods for attaining them will become more apparent with reference to the accompanying drawings in association with embodiments that will described in detail below. Although the present disclosure has been described by way of embodiments, they are merely illustrative embodiments, and those skilled in the art should understand that numerous other alternations and equivalent other embodiments can be devised therefrom. Therefore, the true technical scope of the present disclosure should be defined by the appended claims. Throughout the disclosure, the same reference numerals refer to the same components. The term "and/or" includes a combination of a plurality of described items related thereto or any one item among the plurality of described items related thereto.

Although terms of a first, a second, and the like are used to describe various elements, components and/or sections, it should be construed that these elements, components and/or sections are not limited by these terms. These terms are used only to distinguish a single element, components, or sections from another element, another component, or another section.

Therefore, it should be understood that a first element, a first component, or a first section, which will be described below, may be a second element, a second component, or a second section within the technical scope of the present disclosure.

The terms used herein are not to be taken in a sense that limits the technical concept of the present disclosure, but as an explanation thereof. An expression of a singular form should be understood as including the plural form unless specifically noted otherwise in context. Throughout the disclosure, the terms "comprise" and/or "comprising" specify the presence of components, step, operations and/or elements, but do not preclude the presence or addition of one or more of another component, steps, operations and/or elements.

Also, the terms of "unit," "module", and the like described in the disclosure mean a unit for processing at least one function or operation, and the unit may be implemented with hardware or software, or a combination thereof.

Unless specifically defined otherwise, all terms (including technical and scientific terms) used herein should be interpreted in a sense that is generally understood by those skilled in the art to which the presently disclosed technology belongs. Also, the general terms used in the present disclosure should be interpreted in accordance with definitions in the dictionary and the predefined or prior context, and should not be construed as being ideally or excessively in meaning.

Also, in the following description of the present invention, if a detailed description of known functions and configurations is determined to obscure the interpretation of embodiments of the present invention, the detailed description thereof will be omitted. And, all terms used hereinafter are selected by considering functions in embodiments, and meanings thereof may be different according to a user, the intent of an operator, or custom. Therefore, the meanings of the terms used herein should follow contexts disclosed herein.

The combinations of each step in respective blocks of block diagrams and a flow chart attached herein may be performed by computer program instructions (for example, an execution engine). These computer program instructions may be loaded in processors of a general-purpose computer, a special-purpose computer, or other programmable data processing apparatus. Therefore, the instructions, which are executed by the processor of the computer or other programmable data processing apparatus, create means for performing functions described in the respective blocks of the block diagrams or in the respective steps of the flow chart. To implement functions in specific manner. these computer program instructions may be stored in a computer-usable memory or a computer-readable memory capable of orienting for a computer or other programmable data processing apparatus. As a result, the instructions stored in the computer-usable memory or the computer-readable memory may produce manufacturing items including an instruction means for performing functions described in the respective blocks of the block diagrams and in the respective steps of the flow chart.

Further, the computer program instructions may be loaded in a computer or other programmable data processing apparatus. Consequently, instructions, which operate a computer or other programmable data processing apparatus by executing a series of processing steps that is executed in a computer or other programmable data processing apparatus to create processes executed by a computer, may provide steps for executing functions described in the respective blocks of the block diagrams and the respective steps of the flow chart.

Moreover, the respective blocks or the respective steps may indicate modules, segments, or some of codes, which includes one or more executable instructions for performing a specific logical function(s). In several alternative embodiments, it should be noticed that functions described in the blocks or the steps may occur out of order. For example, two successive blocks or sequences may be substantially executed at the same time or in reverse order according to corresponding functions as necessary.

FIG. 1 is an entire block configuration diagram for describing an apparatus for detecting a vehicle pitch angle using an acceleration sensor and a gyro sensor according to one embodiment of the present disclosure.

Referring to FIG. 1, the apparatus for detecting a vehicle pitch angle using an acceleration sensor and a gyro sensor according to one embodiment of the present disclosure is roughly configured to include an acceleration sensor unit 100, a gyro sensor unit 200, a vehicle state recognition unit 300, a stopping state gravity vector calculation unit 400, an accelerating state vehicle acceleration vector calculation unit 500, a vehicle pitch angle vector calculation unit 600, a vehicle pitch angle calculation unit 700, and the like.

Here, the acceleration sensor unit 100 is a sensor for measuring an acceleration value of a vehicle, is configured with three acceleration sensors, which are horizontally attached to the vehicle and orthogonally intersected with each other to form an X-axis, a Y-axis, and a Z-axis, respectively, and serves to measure acceleration sensor values Ay and Az in a driving direction (that is, the Y-axis) of the vehicle and in a ground direction (that is, the Z axis) thereof and transmit the measured values to the vehicle state recognition unit 300.

The gyro sensor unit 200 is a sensor for measuring an angular velocity value of the vehicle, is configured with three gyro sensors, which are horizontally attached to the vehicle and orthogonally intersected with each other to form Rx, Ry, and Rz, respectively, and serves to measure an angular velocity value in a pitch direction and transmit the measured an angular velocity value to the vehicle state recognition unit 300.

The vehicle state recognition unit 300 serves to determine a stopping state, an accelerating state, and a driving state of the vehicle using the acceleration value and the angular velocity value respectively measured from the acceleration sensor unit 100 and gyro sensor unit 200.

That is, the vehicle state recognition unit 300 receives acceleration sensor values Ay and Az in the driving direction (that is, the Y-axis) of the vehicle and in the ground direction (that is, the Z axis) thereof, which are supplied from the acceleration sensor unit 100, and calculates an inclined angle value with respect to a horizontal plane based on a value of an Atna (Ay/Az). When the calculated angle value is maintained without a variance for a specific predetermined time, the vehicle state recognition unit 300 determines the vehicle as being in the stopping state.

Also, when a variance occurs at the value of the Atna (Ay/Az) in the stopping state, the vehicle state recognition unit 300 determines the vehicle as being in the accelerating state.

Further, when an angular velocity value measured from the gyro sensor unit 200 is equal to or greater than a preset value in the accelerating state, or a moving distance estimated from the acceleration value, which is measured from the acceleration sensor unit 100, is equal to or greater than a preset distance, the vehicle state recognition unit 300 determines the vehicle as being in a driving state.

The gravity vector calculation unit 400 for a stopping state serves to calculate stopping state gravity vector values Gy and Gz using the acceleration sensor values Ay and Az that is measured in the stopping state of the vehicle, wherein the stopping state is determined from the vehicle state recognition unit 300.

The accelerating state vehicle acceleration vector calculation unit 500 serves to calculate vehicle acceleration vector values (Ay−Gy=Vy) and (Az−Gz=Vz) by subtracting the stopping state gravity vector values Gy and Gz, which are calculated from the stopping state gravity vector calculation unit 400, from the acceleration sensor values Ay and Az measured in the accelerating state of the vehicle, wherein the accelerating state is determined from the vehicle state recognition unit 300.

The vehicle pitch angle vector calculation unit 600 serves to calculate vehicle pitch angle vector values Py and Pz by continuously summing the vehicle acceleration vector values Vy and Vz calculated from the accelerating state vehicle acceleration vector calculation unit 500 while the vehicle moves a predetermined distance.

The vehicle pitch angle calculation unit 700 serves to calculate a vehicle pitch angle using a corresponding vehicle pitch angle vector value when a magnitude of the corresponding vehicle pitch angle vector value calculated from the vehicle pitch angle vector calculation unit 600 is equal to or greater than a preset threshold value.

That is, when a magnitude of each of the vehicle pitch angle vector values Py and Pz calculated from the vehicle pitch angle vector calculation unit 600 is equal to or greater than a preset threshold value, the vehicle pitch angle calculation unit 700 may calculate the vehicle pitch angle based on the value of the Atna (Pz/Py).

As described above, the vehicle pitch angle calculated from the vehicle pitch angle calculation unit 700 may be used for various purposes. For example, it may be used in a leveling device of a headlamp, or in calculation of an inclined angle of a roadway surface to prevent the vehicle from sliding when the vehicle begins to start. Also, the vehicle pitch angle may also be used for the purpose of determining a driving route in a navigation, controlling an attitude of the vehicle, improving fuel efficiency thereof, detecting in real time an amount of energy consumption thereof, and the like.

Hereinafter, a method for detecting a vehicle pitch angle using an acceleration sensor and a gyro sensor according to one embodiment of the present disclosure will be described in detail.

Figure 2:
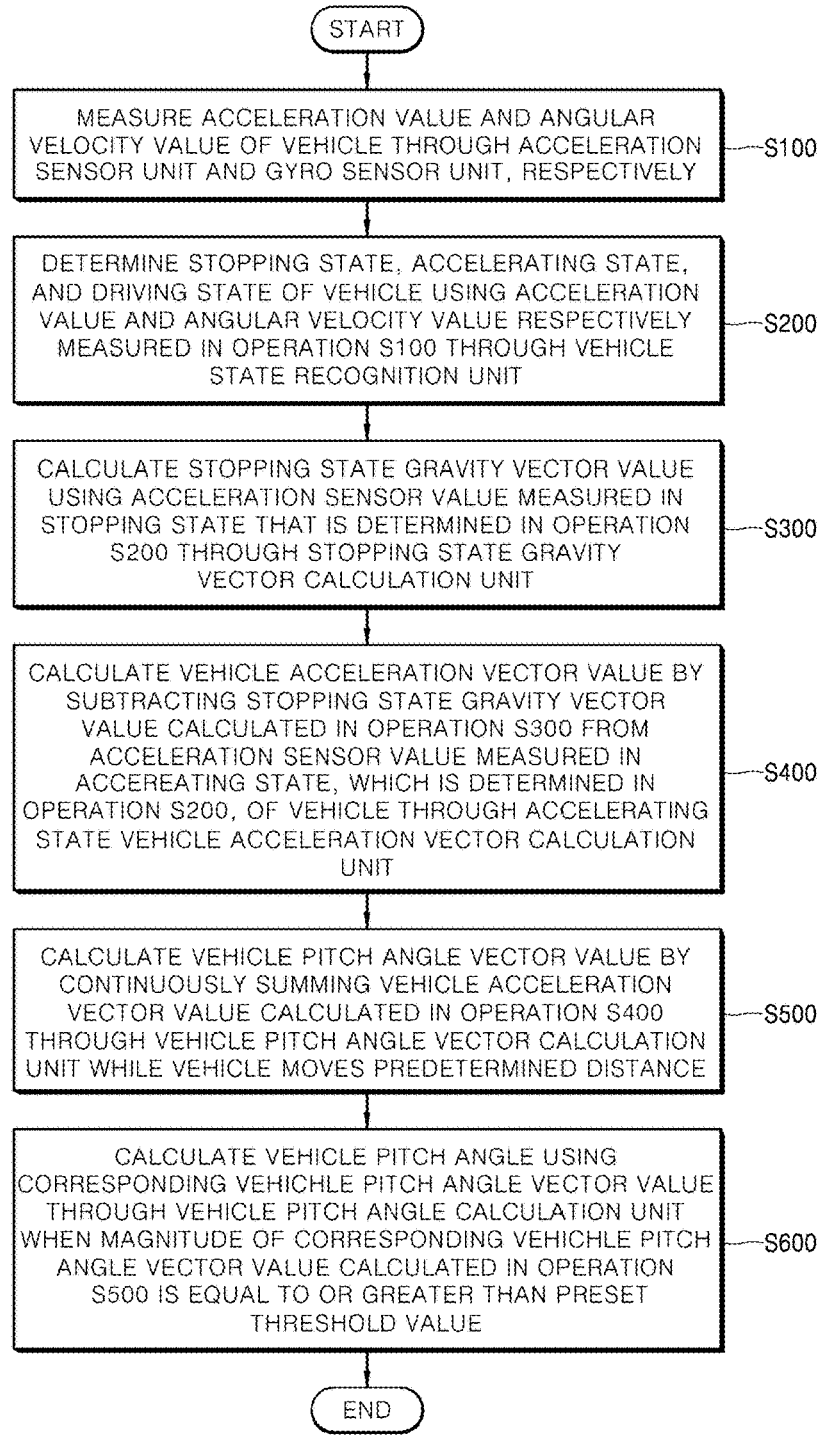
FIG. 2 is an entire flow chart for describing a method for detecting a vehicle pitch angle using an acceleration sensor and a gyro sensor according to one embodiment of the present disclosure.
Figure 3:
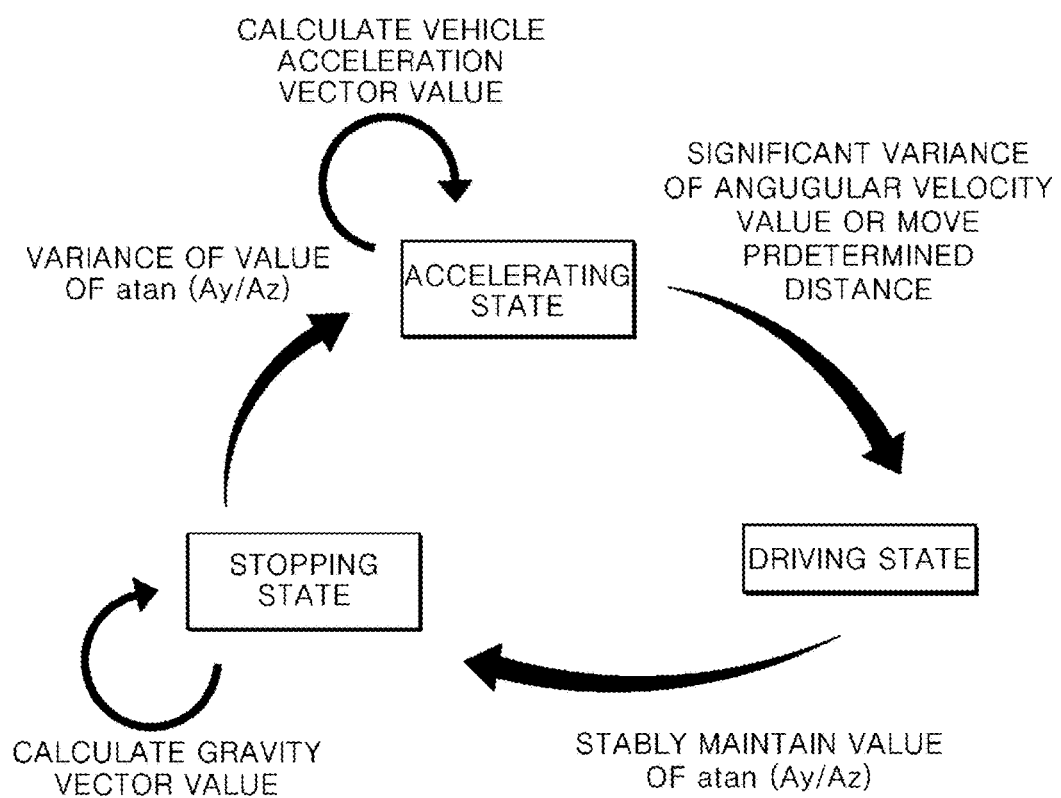
FIG. 3 is a diagram for describing a process of detecting the vehicle pitch angle according to a stopping state, an accelerating state, and a driving state of a vehicle, each of which is determined through a vehicle state recognition unit employed in one embodiment of the present disclosure.
Figure 4:
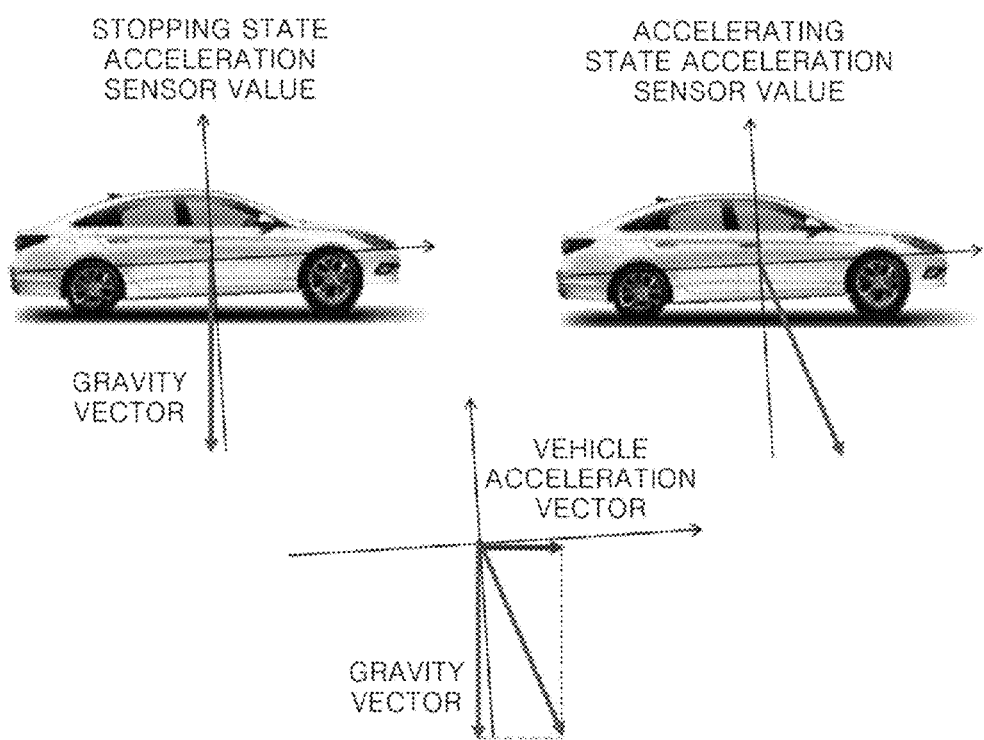
FIG. 4 is a diagram for describing a process of calculating a vehicle acceleration vector value using an acceleration sensor value according to the stopping state and the accelerating state of the vehicle, each of which is determined through the vehicle state recognition unit employed in one embodiment of the present disclosure.
Figure 5:
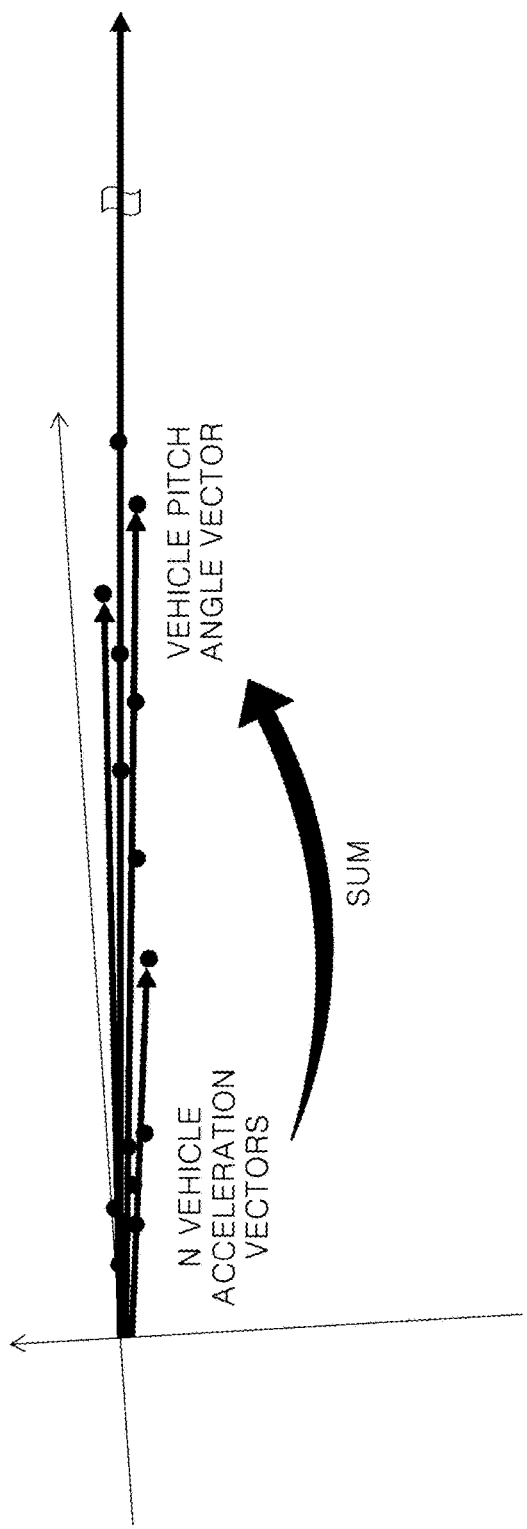
FIG. 5 is a diagram for describing a process of calculating a vehicle pitch angle vector value through a vehicle pitch angle vector calculation unit employed in one embodiment of the present disclosure.
Figure 6:
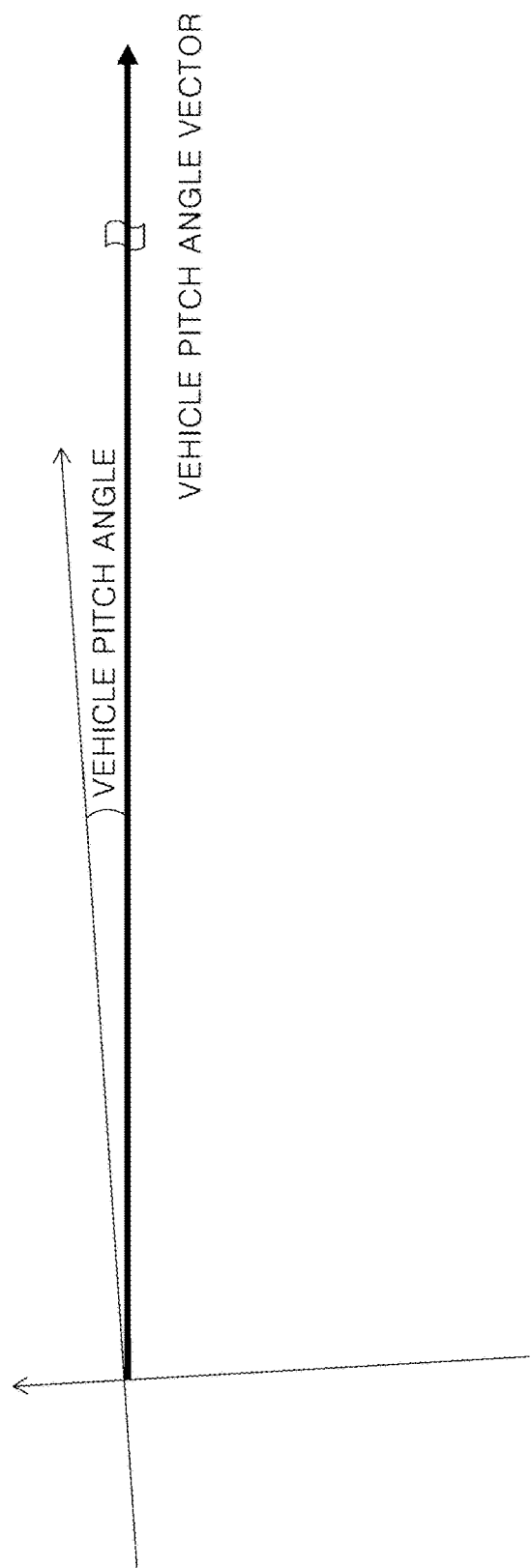
FIG. 6 is a diagram for describing a process of calculating a vehicle pitch angle through a vehicle pitch angle calculation unit employed in one embodiment of the present disclosure.

FIG. 2 is an entire flow chart for describing a method for detecting a vehicle pitch angle using an acceleration sensor and a gyro sensor according to one embodiment of the present disclosure, FIG. 3 is a diagram for describing a process of detecting the vehicle pitch angle according to a stopping state, an accelerating state, and a driving state of a vehicle, each of which is determined through the vehicle state recognition unit employed in one embodiment of the present disclosure, FIG. 4 is a diagram for describing a process of calculating a vehicle acceleration vector value using an acceleration sensor value according to the stopping state and the accelerating state of the vehicle, each of which is determined through the vehicle state recognition unit employed in one embodiment of the present disclosure, FIG. 5 is a diagram for describing a process of calculating a vehicle pitch angle vector value through a vehicle pitch angle vector calculation unit employed in one embodiment of the present disclosure, and FIG. 6 is a diagram for describing a process of calculating a vehicle pitch angle through a vehicle pitch angle calculation unit employed in one embodiment of the present disclosure.

Referring to FIGS. 1 to 6, the method for detecting a vehicle pitch angle using an acceleration sensor and a gyro sensor according to one embodiment of the present disclosure firstly detects an acceleration value of a vehicle and an angular velocity value thereof through the acceleration sensor unit 100 and the gyro sensor unit 200, respectively, in Operation S100.

At this point, in Operation S100, the acceleration sensor unit 100 is configured with three acceleration sensors, which are horizontally attached to the vehicle and orthogonally intersected with each other to form an X-axis, a Y-axis, and a Z-axis, respectively, and measures acceleration sensor values Ay and Az in a driving direction (that is, the Y-axis) of the vehicle and in a ground direction (that is, the Z axis) thereof to transmit the measured values to the vehicle state recognition unit 300.

Also, in Operation S100, the gyro sensor unit 200 is configured with three gyro sensors, which are horizontally attached to the vehicle and orthogonally intersected with each other to form Rx, Ry, and Rz, respectively, and measures an angular velocity value in a pitch direction to transmit the measured angular velocity value to the vehicle state recognition unit 300.

Thereafter, in Operation 5200, a stopping state, an accelerating state, and a driving state of the vehicle is determined through the vehicle state recognition unit 300 using the acceleration value and the angular velocity value respectively measured in Operation S100.

That is, in Operation 5200, the vehicle state recognition unit 300 receives the acceleration sensor values Ay and Az in the driving direction (that is, the Y-axis) of the vehicle and in the ground direction (that is, the Z axis) thereof, which are measured in Operation S100, and calculates an inclined angle value with respect to a horizontal plane based on a value of an Atna (Ay/Az). When the calculated angle value is maintained without a variance for a specific predetermined time, the vehicle state recognition unit 300 determines the vehicle as being in the stopping state (See FIG. 3).

Also, when a variance occurs at the value of the Atna (Ay/Az), the vehicle state recognition unit 300 determines the vehicle as being in an accelerating state (See FIG. 3).

Further, when the angular velocity value measured in Operation S100 is equal to or greater than a preset value in the accelerating state, or a moving distance estimated from the acceleration value, which is measured in Operation S100, is equal to or greater than a preset distance, the vehicle state recognition unit 300 determines the vehicle as being in the driving state (See FIG. 3).

Thereafter, stopping state gravity vector values Gy and Gz are calculated using the acceleration sensor values Ay and Az that are measured in the stopping state, which is determined through the stopping state gravity vector calculation unit 400 in Operation 5200, of the vehicle in Operation 5300 (See FIGS. 3 and 4).

Next, vehicle acceleration vector values (Ay−Gy=Vy) and (Az−Gz=Vz) are calculated by subtracting the stopping state gravity vector values Gy and Gz calculated in Operation 5300 from the acceleration sensor values Ay and Az measured in the accelerating state, which is determined through the accelerating state vehicle acceleration vector calculation unit 500 in Operation 5200, of the vehicle in Operation 5400 (See FIGS. 3 and 4).

That is, the values Ay-Gy and Az-Gz, which are obtained by subtracting the stopping state gravity vector values Gy and Gz from the acceleration sensor values Ay and Az measured in the accelerating state of the vehicle, are referred to the vehicle acceleration vector values Vy and Vz.

At this point, the vehicle acceleration vector values Vy and Vz may be trusted only when accelerating state gravity vector values coincide with the stopping state gravity vector values Gy and Gz. Therefore, to maintain an inclined angle with respect to a horizontal plane of the vehicle, an inclination of a roadway surface should be constant and an inclination of a vehicle body should be stable somewhat.

When a variance is not significantly occurred at the angular velocity value detected through the gyro sensor unit 200, an inclination of a roadway surface at a predetermined distance (for example, about 10 meters) in front of the vehicle is determined to be stable. The predetermined distance may be adjustable in consideration of the degradation of reliability with respect to the vector values and the increase of an amount of sample data as a moving distance is increased.

When a variance of an angle significantly occurs at the roadway surface or the inclination of the vehicle body is varied, this may be sensed through the gyro sensor unit 200.

In such a case, the stopping state is switched to the driving state so that the accelerating state vehicle acceleration vector calculation unit 500 abandons a calculation of the vehicle acceleration vector values Vy and Vz.

Afterward, vehicle pitch angle vector values Py and Pz are calculated by continuously summing the vehicle acceleration vectors Vy and Vz, which are calculated in Operation 5400, through the vehicle pitch angle vector calculation unit 600 while the vehicle moves a predetermined distance in Operation 5500 (See FIG. 5).

That is, when the vehicle is accelerated with a sufficient acceleration on a stable roadway surface, the vehicle pitch angle vector calculation unit 600 continuously sums the vehicle acceleration vector values Vy and Vz calculated in Operation 5400 while the vehicle moves the predetermined distance, thereby calculating the summed vector values. The summed vector values are the vehicle pitch angle vector values Py and Pz.

Meanwhile, the vehicle acceleration vector values Vy and Vz may have errors depending on the performance of sensors, and a direction of each of the errors is not constant.

Therefore, when a plurality of vehicle acceleration vector values Vy and Vz are summed, error values existing in the vehicle acceleration vector values Vy and Vz are offset with each other in the process of summing, and error values of the vehicle pitch angle vector values Py and Pz are relatively less than those of the vehicle acceleration vector values Vy and Vz.

When a magnitude of each of the vehicle acceleration vector values Vy and Vz is very small, reliability of the vector values is degraded. Since the reliability is high when the magnitude of each of the vehicle acceleration vector values Vy and Vz is equal to or greater than a certain value, the vehicle pitch angle is calculated based on a value of an Atna (Pz/Py) only when a magnitude of each of the vehicle pitch angle vector values Py and Pz is equal to or greater than a predetermined value.

That is, when the magnitude of each of the vehicle pitch angle vector values Py and Pz is equal to or greater than a preset threshold value, a vehicle pitch angle is calculated using a corresponding vehicle pitch angle vector value through the vehicle pitch angle calculation unit 700 in Operation 5600 (See FIG. 6).

At this point, in Operation 5600, when the magnitude of each of the vehicle pitch angle vector values Py and Pz, which is calculated in Operation 5500, is equal to or greater than the preset threshold value, the vehicle pitch angle calculation unit 700 may calculate the vehicle pitch angle based on the value of the Atna (Pz/Py).

Meanwhile, the method for detecting a vehicle pitch angle using an acceleration sensor and a gyro sensor according to the present disclosure may also be implemented with computer-readable codes on a computer-readable storage medium. The computer-readable storage medium includes all sort of storage devices in which computer-readable data is stored.

For example, the computer-readable storage medium includes a read-only-memory (ROM), a random-access memory (RAM), a compact disc (CD) ROM, a magnetic tape, a hard disk, a floppy disk, a removable storage device, a non-volatile memory (for example, a flash memory), an optical data storage device, and the like.

Further, the computer-readable storage medium may be distributed to computer systems over a network, in which computer readable codes may be stored and executed in a distributed manner.

As described above, in accordance with the apparatus for detecting a vehicle pitch angle using an acceleration sensor and a gyro sensor and the method thereof, a vehicle pitch angle is calculated using an acceleration sensor and a gyro sensor through a structure effective and cost-effective system so that there is an advantage in which costs may be effectively reduced in comparison with costs of a conventional apparatus for detecting a vehicle pitch angle.

Although preferred embodiments of the apparatus for detecting a vehicle pitch angle using an acceleration sensor and a gyro sensor and the method thereof have been described, the present disclosure is not limited thereto, and it should be understood that numerous other modifications and embodiments can be devised by those skilled in the art that will fall within the spirit and scope of the principles of this disclosure.

What is claimed is:

1. An apparatus for detecting a vehicle pitch angle using an acceleration sensor and a gyro sensor, comprising:
   an acceleration sensor unit configured to measure an acceleration value of a vehicle; a gyro sensor unit configured to measure an angular velocity value;
   a vehicle state recognition unit configured to determine a stopping state, an accelerating state, and a driving state of the vehicle using the acceleration value and the angular velocity value which are respectively measured from the acceleration sensor unit and the gyro sensor unit;
   a stopping state gravity vector calculation unit configured to calculate a stopping state gravity vector value using an acceleration value measured in the stopping state that is determined from the vehicle state recognition unit;
   an accelerating state vehicle acceleration vector calculation unit configured to calculate a vehicle acceleration vector value by subtracting the stopping state gravity vector value, which is calculated from the stopping state gravity vector calculation unit, from an acceleration value measured in the accelerating state that is determined from the vehicle state recognition unit;
   a vehicle pitch angle vector calculation unit configured to calculate a vehicle pitch angle vector value by continuously summing the vehicle acceleration vector value calculated from the accelerating state vehicle acceleration vector calculation unit while the vehicle moves a predetermined distance; and
   a vehicle pitch angle calculation unit configured to calculate a vehicle pitch angle using a corresponding vehicle pitch angle vector value when a magnitude of the corresponding vehicle pitch angle vector value calculated from the vehicle pitch angle vector calculation unit is equal to or greater than a preset threshold value.

2. The apparatus of claim 1, wherein the acceleration sensor unit is configured with three acceleration sensors, which are horizontally attached to the vehicle and orthogonally intersected with each other to form an X-axis, a Y-axis, and a Z-axis, respectively, and transmits acceleration sensor values Ay and Az in a driving direction (that is, the Y-axis) of the vehicle and a ground direction (that is, the Z-axis) thereof to the vehicle state recognition unit.

3. The apparatus of claim 1, wherein the gyro sensor unit is configured with three gyro sensors, which are horizontally attached to the vehicle and orthogonally intersected with each other to form Rx, Ry, and Rz, respectively, and transmits the angular velocity value in a pitch direction to the vehicle state recognition unit.

4. The apparatus of claim 1, wherein the vehicle state recognition unit calculates an inclined angle value with respect to a horizontal plane based on a value of an Atna (Ay/Az) by receiving acceleration sensor values Ay and Az in the driving direction (that is, the Y-axis) of the vehicle and the ground direction (that is, the Z-axis) thereof from the acceleration sensor unit, and determines the vehicle as being in the stopping state when the calculated angle value is maintained without a variance for a specific predetermined time.

5. The apparatus of claim 4, wherein, when a variance occurs at the value of the Atna (Ay/Az) in the stopping state, the vehicle state recognition unit determines the vehicle as being in the accelerating state.

6. The apparatus of claim 4, wherein, when the angular velocity value measured from the gyro sensor unit in the accelerating state is equal to or greater than a preset value, or a moving distance, which is estimated from the acceleration sensor values Ay and Az measured from the acceleration sensor unit, of the vehicle is equal to or greater than a preset distance, the vehicle state recognition unit determines the vehicle as being in the driving state.

7. The apparatus of claim 1, wherein the vehicle state recognition unit calculates an inclined angle value with respect to a horizontal plane based on a value of an Atna (Ay/Az) by receiving acceleration sensor values Ay and Az in the driving direction (that is, the Y-axis) of the vehicle and the ground direction (that is, the Z-axis) thereof from the acceleration sensor unit, and determines the vehicle as being in the stopping state when the calculated angle value is maintained without a variance for a specific predetermined time, and the stopping state gravity vector calculation unit calculates stopping state gravity vector values Gy and Gz using the acceleration sensor values Ay and Az that are measured in the stopping state, which is determined from the vehicle state recognition unit, of the vehicle.

8. The apparatus of claim 1, wherein the vehicle state recognition unit calculates an inclined angle value with respect to a horizontal plane based on a value of an Atna (Ay/Az) by receiving acceleration sensor values Ay and Az in the driving direction (that is, the Y-axis) of the vehicle and the ground direction (that is, the Z-axis) thereof from the acceleration sensor unit, and determines the vehicle as being in the stopping state when the calculated angle value is maintained without a variance for a specific predetermined time and as being in the accelerating state when a variance occurs at the value of the Atna (Ay/Az) in the stopping state, the stopping state gravity vector calculation unit calculates stopping state gravity vector values Gy and Gz using the acceleration sensor values Ay and Az measured in the stopping state, which is determined from the vehicle state recognition unit, of the vehicle, and the accelerating state vehicle acceleration vector calculation unit calculates vehicle acceleration vector values (Ay−Gy=Vy) and (Az−Gz=Vz) by subtracting the stopping state gravity vector values Gy and Gz, which are calculated from the stopping state gravity vector calculation unit, from the acceleration sensor values Ay and Az measured in the accelerating state, which is determined from the vehicle state recognition unit, of the vehicle.

9. The apparatus of claim 8, wherein the vehicle pitch angle vector calculation unit calculates vehicle pitch angle vector values Py and Pz by continuously summing the vehicle acceleration vector values Vy and Vz calculated from the accelerating state vehicle acceleration vector calculation unit, and the vehicle pitch angle calculation unit calculates a vehicle pitch angle based on the value of the Atna (Pz/Py) when a magnitude of each of the vehicle pitch angle vector values Py and Pz calculated from the vehicle pitch angle vector calculation unit is equal to or greater than a preset threshold value.

10. A method for detecting a vehicle pitch angle using an acceleration sensor unit and a gyro sensor unit, comprising:
(a) measuring an acceleration value and an angular velocity value through the acceleration sensor unit and the gyro sensor unit, respectively;
(b) determining a stopping state, an accelerating state, and a driving state of a vehicle through a vehicle state recognition unit using the acceleration value and the angular velocity value which are measured in Operation (a);
(c) calculating a stopping state gravity vector value through a stopping state gravity vector calculation unit using an acceleration sensor value measured in the stopping state, which is determined in Operation (b), of the vehicle;
(d) calculating a vehicle acceleration vector value through an accelerating state vehicle acceleration vector calculation unit by subtracting the stopping state gravity vector value calculated in Operation (c) from an acceleration sensor value measured in the accelerating state, which is measured in Operation (b), of the vehicle;
(e) calculating a vehicle pitch angle vector value through a vehicle pitch angle vector calculation unit by continuously summing the vehicle acceleration vector value calculated in Operation (d); and
(f) calculating a vehicle pitch angle using a corresponding vehicle pitch angle vector value through a vehicle pitch angle calculation unit when a magnitude of the corresponding vehicle pitch angle vector value calculated in Operation (e) is equal to or greater than a preset threshold value.

11. The method of claim 10, wherein, in Operation (a), the acceleration sensor unit is configured with three acceleration sensors, which are horizontally attached to the vehicle and orthogonally intersected with each other to form an X-axis, a Y-axis, and a Z-axis, respectively, and transmits acceleration sensor values Ay and Az in a driving direction (that is, the Y-axis) of the vehicle and a ground direction (that is, the Z-axis) thereof to the vehicle state recognition unit.

12. The method of claim 10, wherein, in Operation (a), the gyro sensor unit is configured with three gyro sensors, which are horizontally attached to the vehicle and orthogonally intersected with each other to form Rx, Ry, and Rz, respectively, and transmits the angular velocity value in a pitch direction to the vehicle state recognition unit.

13. The method of claim 11, wherein, in Operation (b), the vehicle state recognition unit calculates an inclined angle value with respect to a horizontal plane based on a value of an Atna (Ay/Az) by receiving the acceleration sensor values Ay and Az in the driving direction (that is, the Y-axis) of the vehicle and the ground direction (that is, the Z-axis) thereof from Operation (a), and determines the vehicle as being in the stopping state when the calculated angle value is maintained without a variance for a specific predetermined time.

14. The method of claim 13, wherein, when a variance occurs at the value of the Atna (Ay/Az) in the stopping state, the vehicle state recognition unit determines the vehicle as being in the accelerating state.

15. The method of claim 14, wherein when the angular velocity value measured in Operation (a) in the accelerating state is equal to or greater than a preset value, or a moving distance, which is estimated from the acceleration sensor values Ay and Az measured in Operation (a), of the vehicle is equal to or greater than a preset distance, the vehicle state recognition unit determines the vehicle as being in the driving state.

16. The method of claim 10, wherein, in Operation (b), the vehicle state recognition unit calculates an inclined angle value with respect to a horizontal plane based on a value of an Atna (Ay/Az) by receiving acceleration sensor values Ay and Az in the driving direction (that is, the Y-axis) of the vehicle and the ground direction (that is, the Z axis) thereof from Operation (a), and determines the vehicle as being in the stopping state when the calculated angle value is maintained without a variance for a specific predetermined time, and in Operation (c), the stopping state gravity vector calculation unit calculates stopping state gravity vector values Gy and Gz using the acceleration sensor values Ay and Az that are measured in the stopping state, which is determined from the vehicle state recognition unit, of the vehicle.

17. The method of claim 11, wherein, in Operation (b), the vehicle state recognition unit calculates an inclined angle value with respect to a horizontal plane based on a value of an atan (Ay/Az) by receiving the acceleration sensor values Ay and Az in the driving direction (that is, the Y-axis) of the vehicle and the ground direction (that is, the Z axis) thereof from Operation (a), and determines the vehicle as being in the stopping state when the calculated angle value is maintained without a variance for a specific predetermined time and as being in the accelerating state when a variance occurs at the value of the atan (Ay/Az) in the stopping state, in Operation (c), the stopping state gravity vector calculation unit calculates stopping state gravity vector values Gy and Gz using the acceleration sensor values Ay and Az measured in the stopping state, which is determined in Operation (b), of the vehicle, and in Operation (d), the accelerating state vehicle acceleration vector calculation unit calculates vehicle acceleration vector values (Ay−Gy=Vy) and (Az−Gz=Vz) by subtracting the stopping state gravity vector values Gy and Gz, which are calculated in Operation (c), from the acceleration sensor values Ay and Az measured in the accelerating state, which is determined in Operation (b), of the vehicle.

18. The method of claim 17, wherein, in Operation (e), the vehicle pitch angle vector calculation unit calculates vehicle pitch angle vector values Py and Pz by continuously summing the vehicle acceleration vector values Vy and Vz calculated in Operation (d), and in Operation (f), the vehicle pitch angle calculation unit calculates a vehicle pitch angle based on the value of the atan (Pz/Py) when a magnitude of each of the vehicle pitch angle vector values Py and Pz calculated in Operation (e) is equal to or greater than a preset threshold value.

* * * * *